Dec. 16, 1958     R. C. GSCHWIND     2,864,585
AUTOMATIC CABLE REWIND FOR A SAFETY DEVICE
Filed April 6, 1955

INVENTOR.
ROBERT C. GSCHWIND
BY Clarence E. Ohrudy
HIS ATTORNEY.

United States Patent Office 2,864,585
Patented Dec. 16, 1958

2,864,585

AUTOMATIC CABLE REWIND FOR A SAFETY DEVICE

Robert C. Gschwind, Chicago, Ill.

Application April 6, 1955, Serial No. 499,729

1 Claim. (Cl. 254—152)

This invention relates to an automatic cable rewind for a safety device and has for its principal object a construction of a device of this character which requires relatively few parts and one which may be economically manufactured and sold.

Another object of this invention is in the provision of an automatic rewind for a safety device which will not interfere with the operation of the braking means as contained in the safety device.

Still another object of this invention is in the provision in a device of this character whereby the amount of cable to be rewound by the device may be adjusted.

Yet another and equally important object of this invention is in the provision of a rewind device whereby the tension of a rewind mechanism may be adjusted without interference with the operation of the safety device.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
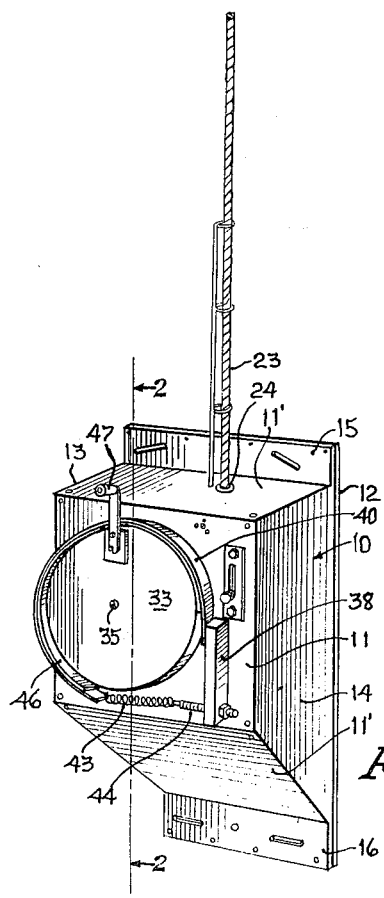
Fig. 1 is a perspective view of my safety device having my automatic rewind incorporated thereon.

This automatic rewind mechanism is associated with a safety device for preventing free falls into space such as is shown and described in my co-pending application Serial No. 419,881, now Patent No. 2,729,425. Such safety device comprises a housing 10 having a front wall 11 and a back wall 12 with end walls 11' and side walls 13 and 14 respectively. The walls 11 and 12 provide longitudinally extending portions 15 and 16 to which may be attached a means for attaching the device to any stationary point.

Figure 2:
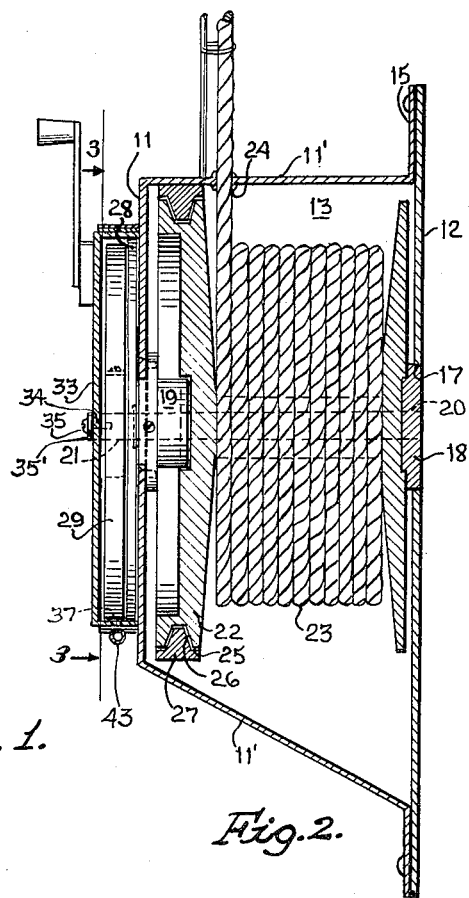
Fig. 2 is a sectional detail view taken substantially on line 2—2 of Fig. 1.

The back wall 12 has formed therein a circular opening 17, in which is securely fitted a bearing 18. Journalled in this bearing 18 is a horizontal shaft 20 extending laterally from the wall 12. This shaft 20 passes through a like bearing 19 securely fitted in the front wall 11 and has its free end 21 projecting outwardly of the housing 10 as shown in Fig. 2. Mounted on this shaft 20 between the walls 11 and 12 and within the housing 10 is a pulley member 22. Coiled about this pulley member 22 within the housing 10 is a safety cable 23 having one end fixedly secured to the shaft 20 and its opposite free end passing out of the housing 10 through an aperture 24 formed in one of the end walls 11'.

One wall 25 of the pulley member 22 has formed in its peripheral edge a substantially U-shaped channel 26 for the reception of a V-belt brake 27. This brake 27 is made operative by parts (not shown) when the anti-clockwise rotation of such pulley member 22 obtains a predetermined speed. The V-belt brake 27 is made to frictionally engage the U-shaped channel 26 so as to prevent rotation of the pulley member 22 and the escape of the safety cable 23.

Loosely journalled on the free end 21 of the shaft 20 and resting on the wall 11 of the housing 10 is a circular spacer disc 28. Seated on this spacer disc 28 and coiled about the shaft 20 is a flat spring 29. The inner end 30 of this spring 29 is fixedly attached at 31 to a washer disc 32. This washer disc 32 is fixedly attached to the shaft 20 in a manner hereinafter described.

The free end 21 of the shaft 20 has a flat side 21' formed thereon. The center aperture of the washer disc 32 has a corresponding flat side 32' so that when it is placed on the free end 21 of the shaft 20 the flat sides 21' and 32' will be in confronting relation to each other and thereby efficiently secure the washer disc 32 to the shaft 20.

Over the coiled spring 29 is adapted to be placed a circular cover 33. This cover is provided at its center point with an aperture 34 through which is adapted to pass a screw 35 having its end threaded into an aperture formed in the free end 21 of the shaft 20. Between the cover 33 and the head of the screw 35 is a washer 35' so the cover will not rotate with the shaft 20. In so threading the screw 35 into the shaft 20 it also passes through the center opening formed in the washer disc 32 so as to fixedly secure the washer disc 32 to the shaft 20 for rotation therewith. The opposite free end 36 of the spring 29 is fixedly secured as at 37 to the inside edge of the cover 33, so as to form an operative connection by means of the spring 29 between the washer disc 32 and the cover 33.

Figure 3:
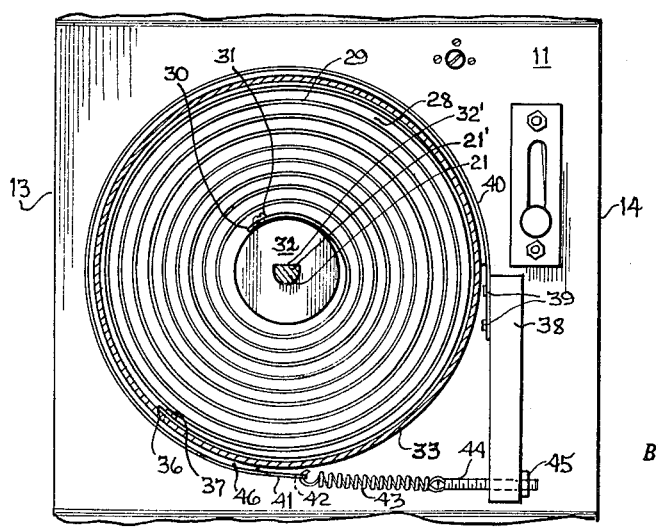
Fig. 3 is a sectional detail view taken on line 3—3 of Fig. 2.

Secured to the wall 11 of the housing 10 in any suitable manner is a bracket 38. This bracket 38 has secured thereto as at 39 one end of a brake band 40. The opposite end of this brake band 40 terminates into a lip 41 having formed therein an aperture 42 for receiving one end of a coil spring 43. The opposite end of the coil spring 43 is fixedly secured to a threaded bolt 44 adapted to pass through an aperture formed in the opposite end of the bracket 38 as shown in Figs. 1 and 3. This bolt 44 has threaded on its free end a nut 45. The inner face of the brake band 40 is lined with a brake shoe 46 made of any suitable material. The arrangement is as follows: the tension of the brake band in relation to the cover 33 may be adjusted by the tightening of the nut 45 on the threaded bolt 44, thus moving the brake band in a counter-clockwise direction so as to frictionally engage the cover 33 to hold it against rotation.

Under such a construction as the cable 23 passes out of the housing 10 through the aperture 24 the pulley member 22, the shaft 20, and the washer 32 will all rotate in a counter-clockwise direction. This counter-clockwise rotation will tighten the coils of the spring 29 so that when the outward movement of the cable 23 stops and no longer is there pulling pressure thereon, the spring 29 will tend to rotate in a clock-wise direction to return to its original position.

Such rotation of the spring 29 will cause the shaft 20 to also rotate in a clock-wise direction so as to rewind the cable 23 on the pulley member 22. In the event that this device is worn by one who is required to work on the outside wall of a building, and who will by necessity be required to lower himself periodically, this device will permit such action without effecting the rewinding condition thereof. This is accomplished by the fact that after the spring 29 has tightened its coils to a predetermined degree, the pressure created on the cover 33 through the action of the spring 29 thereof will cause the cover 33 to rotate in a like direction notwithstanding the braking effect as created by the brake band 40. The amount of pressure required to rotate the cover 33 may be regulated by the threading of the bolt 44 on the nut 45. That is to say, if the brake band 40 is tightened to its utmost the cover 33 will be completely prevented from rotating under the pressure of the coiling of the spring 29.

In the event that after the user of the device has lowered himself to a predetermined distance and he wishes to permit more freedom of action of the cable within the housing 10, he may manually remove the braking tension between the cover 33 and the brake band 40 by rotating the cover 33 in an anti-clockwise direction. This movement will lessen the coiled tension of the spring 29. To facilitate such movement I have provided the cover 33 with a handle 47.

The function and operation of this rewind device will not affect in any measure the novel braking means for preventing rotation of the pulley member 22 within the housing 10 as set forth in my heretofor mentioned co-pending application.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

An automatic cable rewind for a safety device comprising a housing for said cable, a rotatable shaft journalled in said housing carrying a cable pulley member, a cable rewind spring carried exteriorly of said housing, one end of said shaft projecting out of said housing and having means providing operative connection to said spring, a cover for said spring loosely carried by said one end of said shaft, with said shaft being freely rotatable within said cover, said spring coiled about said shaft under said cover and having operative connection to said cover, said coils of said spring increasing in tension by continuous rotation of said shaft in one direction, said cover rotatable in said one direction of said shaft when said coils attain a predetermined tension, means for controlling the rotation of said cover, and means for adjusting said controlling means.

References Cited in the file of this patent
UNITED STATES PATENTS

| | | |
|---|---|---|
| 607,556 | Swyny et al. | July 19, 1898 |
| 2,594,484 | Nixon | Apr. 29, 1952 |